Jan. 7, 1964  L. N. HALAUNBRENNER  3,116,624
DISCONNECTABLE WASHING MACHINE
Filed July 5, 1961  4 Sheets-Sheet 1

INVENTOR
Lazare Nathan Halaunbrenner
By
Watson, Cole, Grindle & Watson.
ATTORNEYS Jan. 7, 1964 L. N. HALAUNBRENNER 3,116,624
DISCONNECTABLE WASHING MACHINE
Filed July 5, 1961 4 Sheets-Sheet 2
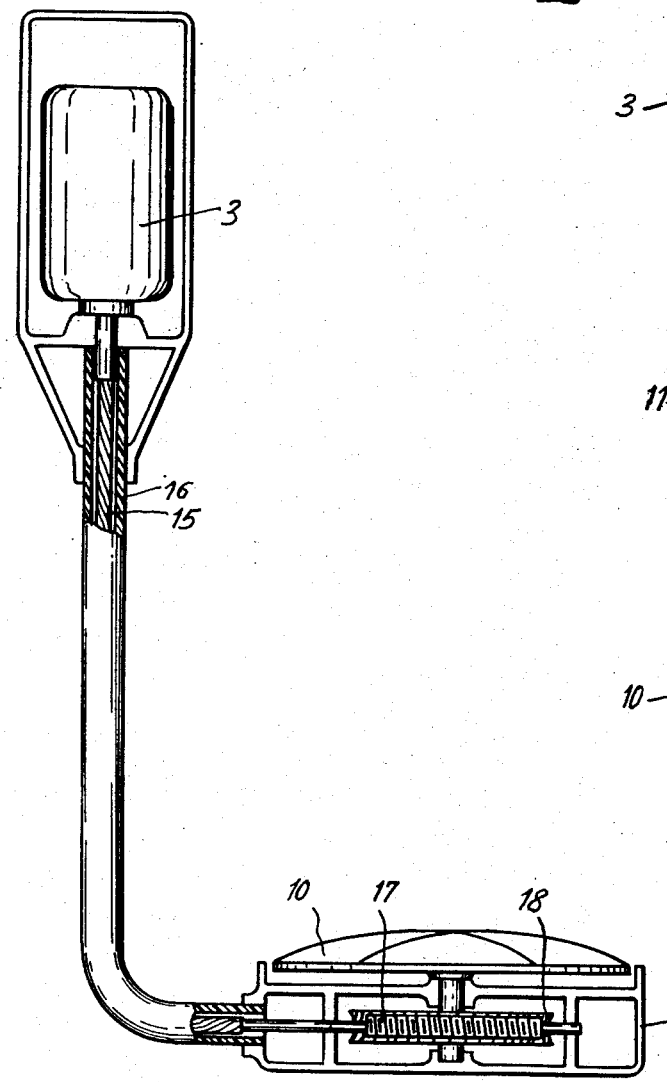
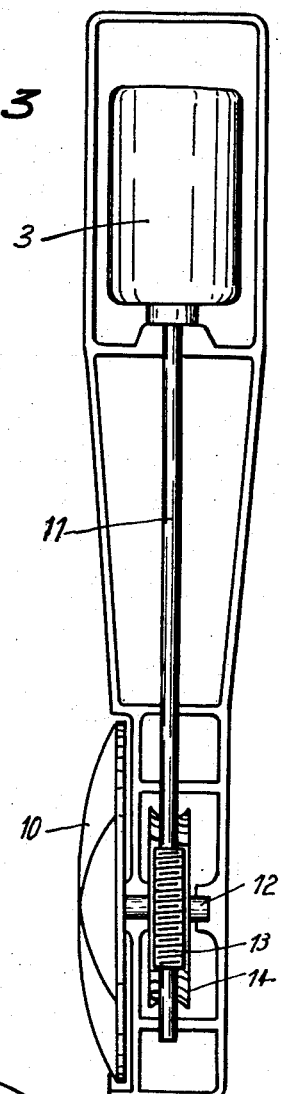

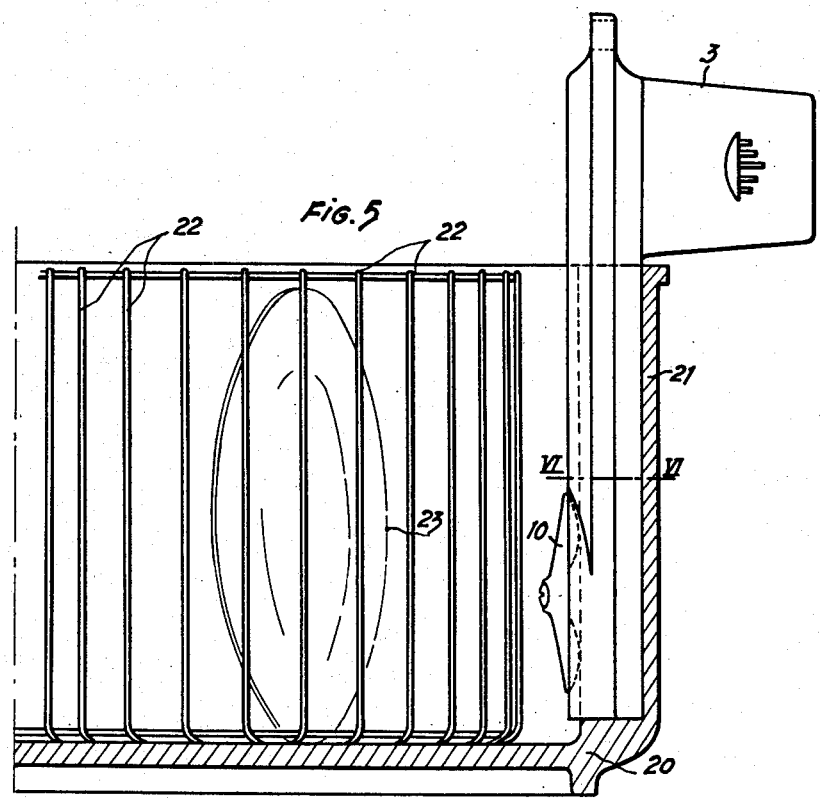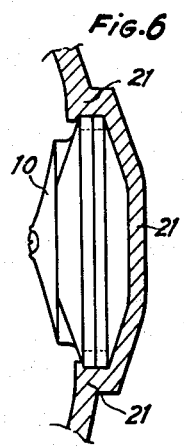

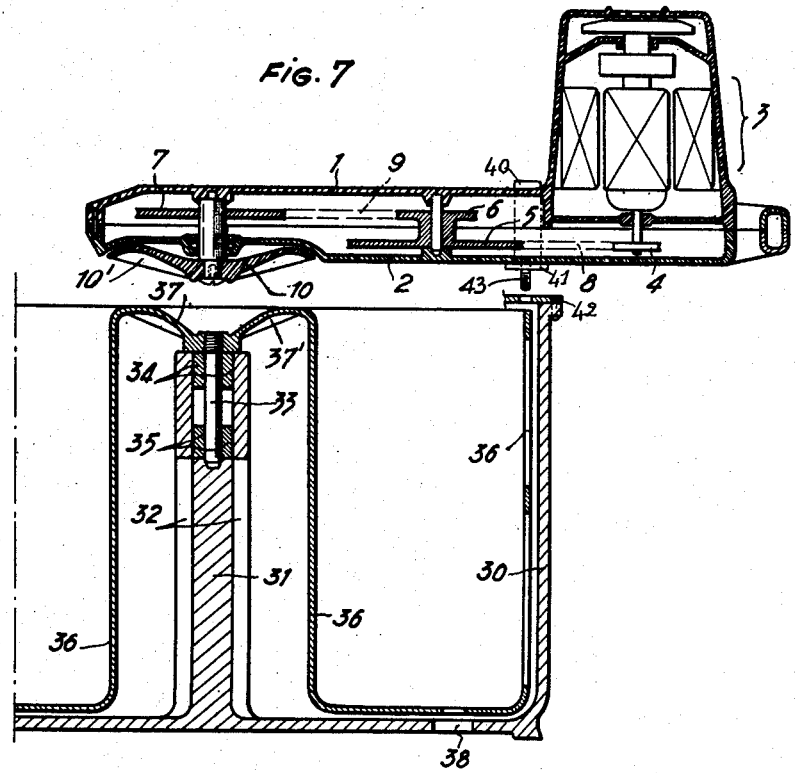
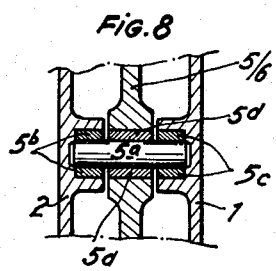

United States Patent Office 3,116,624
Patented Jan. 7, 1964

3,116,624
DISCONNECTABLE WASHING MACHINE
Lazare Nathan Halaunbrenner, 17 Blvd. Edgar Quinet,
Colombes, France
Filed July 5, 1961, Ser. No. 121,899
Claims priority, application France July 6, 1960
1 Claim. (Cl. 68—4)

My invention has for its object an improved agitator or drive mechanism of a removable type for various machines of which such a unit forms the driving part, to wit: a machine for washing fabrics, a "spin" drying or draining machine, a dish washing machine and the like. Other objects of my invention will appear upon reading of the following description.

The drive unit includes an electric motor and a transmission, both enclosed inside a casing which separates them from the water, and a rotor provided with radial projecting ribs and located outside the casing. In a preferred embodiment, the casing carrying the rotor at the end opposed to the electric motor is substantially prismatic, elongated and flat.

The fabric-washing machine is constituted by said unit in its above preferred embodiment and a vat including a slideway in which may be positioned adjustably the elongated prismatic section of the casing, the latter being held fast in its adjusted position through clamping. The machine for washing dishes is the same as the preceding machine, inside the vat of which is removably fitted a basket constituted by a wire-netting and adapted to carry the plates and dishes.

The disconnectable draining machine includes the above-mentioned drive unit associated with a vat carrying the latter and a draining basket having a rotary vertical axis carried inside the vat, the draining basket being provided with a central upper section into which are nested the ribs of the rotor of the drive unit.

My invention will be readily understood upon reading of the following detailed description given, reference being had to the accompanying diagrammatic drawings given by way of example and by no means in a limiting sense. In said drawings:

FIG. 3 is a vertical axial cross-section of a first modification of the agitator unit illustrated in FIGS. 1 and 2.

FIG. 4 is again a vertical axial cross-section illustrating a further modification of the agitator unit according to FIGS. 1 and 2.

FIG. 5 is a vertical cross-section of a vat for washing plates and dishes inside which my improved unit in its preferred embodiment is shown as carried sideways.

FIG. 6 is a cross-section through line VI—VI of FIG. 5 of the means for securing and adjusting the unit inside the vat.

FIG. 7 is partly a cross-section similar to FIG. 1 showing a slightly different arrangement for the parts of the agitator or drive unit and partly a cross-section through the same plane of the draining vat, the two sections of FIG. 7 being slightly separated from each other, so as to better show the interengagement of the rotor of the unit with the corresponding section of the draining basket.

FIG. 8 is a partial cross-section through the axis of the pulleys of FIG. 7 in a modified embodiment provided with self-lubricating roller bearings.

Figure 1:
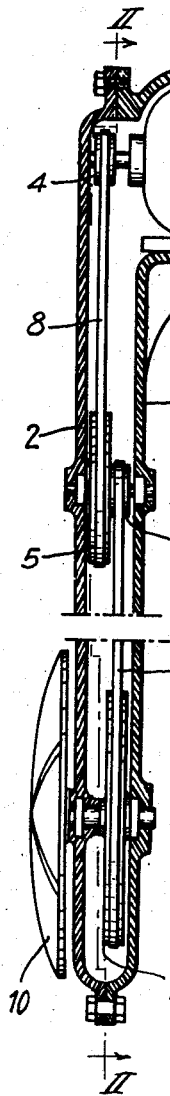
FIG. 1 is a vertical transverse cross-section through line I—I of FIG. 2 of the agitator unit for a washing machine executed in accordance with my invention.
Figure 2:
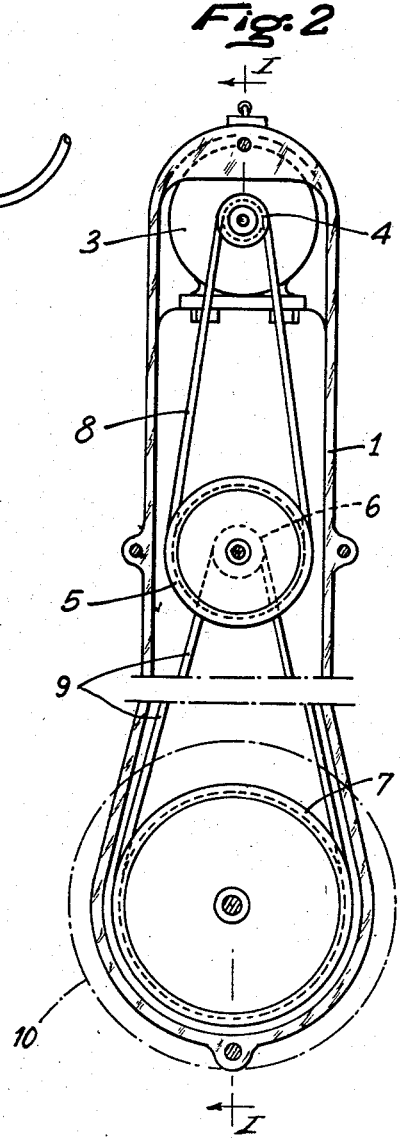
FIG. 2 is a vertical cross-section of said unit through line II—II of FIG. 1.

As illustrated in FIGS. 1 and 2, the portable unit may be constituted by a two-part casing 1–2, carrying a small electric motor 3, the shaft of which is rigid with a pulley 4. A further pulley 5 is rotatably mounted inside the casing 1–2, the diameter of said pulley 5 being larger than that of the pulley 4. A further pulley 6 is keyed to the same shaft as the pulley 5 or, still better, is rigid with the latter, said further pulley 6 being of a smaller diameter than the pulley 5. There is also rotatably mounted inside the casing 1–2 a pulley 7 of a much larger diameter than the two above-mentioned pulleys, while the belts 8 and 9 provide for the transmission of the rotary movement between the pulleys 4 and 5 and between the pulleys 6 and 7, said pulleys being preferably grooved. To the shaft of the pulley 7, which extends through the front wall 2 of the casing is keyed the rotor 10.

Said system of pulleys and belts forms the speed reducer which is required so that the rotor 10 may revolve at a suitable speed while resorting preferably to a light motor having a high rotary speed.

The casing 1–2 may be advantageously made of plastic material and the rotor 10 may also be made of such material.

It is apparent that the use of such a unit is extremely simple. As a matter of fact, the latter being positioned inside a container carrying water whether cold, tepid or hot according to the nature of the articles to be washed, the agitator unit is immersed inside said container, care being taken to make it engage the wall of the container, the rotor lying obviously inside the container, and the electric motor is then energized through a suitable switch. It is possible, in order that the operator need not hold the unit during its working, to provide the casing 1–2 on the back of its rear section 1 with means for securing the unit to the edge of the container serving for the washing procedure.

As illustrated in FIG. 3, it is possible to obtain a reduction of speed between a motor 3 arranged vertically and the rotor 10, by means of a spindle 11, and a gear 12 including a worm 13 and a wormwheel 14.

As illustrated in FIG. 4, the motor may be arranged again vertically and control the rotor through a yielding shaft 15 secured to the shaft of said motor and said yielding shaft housed preferably inside a flexible sheath 16 of plastic material, for instance, carries at its outer end a worm 17 engaging a wormwheel 18 housed inside a small casing 19, said wormwheel 18 being coaxially rigid with the rotor 10.

It is apparent that the apparatus may be executed in various manners other than that which has been disclosed, and more particularly the agitator unit may be rigid with the container to be used with it, so that it is no longer necessary for the operator to hold it in position.

FIG. 8 shows a modification of the fitting of the pulleys 5 and 6 on a common shaft 5a. The members shown at 5b, 5c, 5d are self-lubricating roller bearings or bearings carrying a provision of lubricating material. It is apparent that the outer roller bearings 5b and 5c may be cut out, the pulley 5 or 6 revolving round its shaft with the interposition of a single roller bearing 5d.

The presence of the other roller bearings is of interest inasmuch as, if one of the roller bearings is jammed in spite of the care taken, the other roller bearings ensure continuous rotation under excellent conditions. Said double safety means allows a very long operation without any inspection being required inside the unit casing.

As already mentioned, the casing carries in a preferred embodiment the motor at the end opposed to the rotor and said casing is substantially prismatic, elongated and flat. Said preferred shape is used with fabric-washing machines or machines for washing dishes, as also with a type of drying or draining machine to be described hereinafter.

FIGS. 5 and 6 show means for securing the unit when used as an agitator. As a consequence of the above-mentioned preferred shape, the unit may be positioned and held inside a slideway formed in the wall of the washing vat. By reason of the frictional grip of the slideway on the prismatic casing of the unit, the unit is held fast in various positions on the slideway. If required, it is also possible to provide a clamping screw which is not illustrated.

In the embodiment illustrated, the slideway forms an expansion 21 of the sidewall of the vat 20. Said slideway may also form an independent member fitted through any known or suitable means to the vertical or slightly oblique wall of any vat whatever. The position of the rotor may be thus adjusted as required by the depth of the vat.

In such a case, the washing machine may be constituted by a vat, a slideway and the agitator unit described.

The described apparatus may be transformed into a machine for washing plates and dishes (FIG. 5) simply by introducing inside the vat 20 a basket 22 constituted by a wire-netting, the shape of which is such that it holds, in accordance with the well-known arrangements of plate-racks, plates and dishes such as 23 with a sufficient spacing between them, by say one to a few centimeters, so that the jets of liquid propelled by the rotor may flow steadily between them. The basket may be removed with the washed dishes and be laid outside the container, so that the latter may drain and become dry.

My improved stirring unit may also serve for driving a draining or drying machine as illustrated by way of example in FIG. 7. Said draining machine includes chiefly a vat 30 provided with a central pillar 31 with or without stiffening ribs 32, said pillar being possibly removable and carrying, through the agency of the roller bearings 34 and 35, the rotary pivot 33 of a draining basket 36. Said basket has an annular shape surrounding the central pillar 31. Its outer surface is perforated with slots or holes, so as to provide a passage for the water expelled by the speedy rotation of the basket. Said rotation is obtained by resorting to the agitator or drive unit of the washing machine. The elongated section of the casing is laid horizontally over the vat 30, the surface of the rotor or at least the radial ribs thereof being positioned accurately over the corresponding outer surfaces of the central sections 37 of the draining basket 36. The ribs 10' of the rotor are positioned thus inside corresponding recesses 37' formed in the sections 37 and the rotation of the rotor drives the draining basket into rotation.

In FIG. 7, the drive unit is illustrated as slightly raised vertically above its operative basket-driving position, so as to provide a greater clarity for the drawings. The unit is secured to the vat 30, for instance by metal clamping members comprising collar 40 carrying plate 41, attached to plate 42 by screws 43, which clamping members may be replaced by any other equivalent known means. The fabrics to be drained are positioned in the annular section of the basket 36. When the drive unit is started, the basket is driven into rotation and the water impregnating the pieces of fabric is expelled by centrifugal force. It is collected by the vat 30 and removed through the lower port 38.

It will be remarked that the vat of the above-described washing machine may serve for a draining machine, provided a removable central pivot 31 is inserted therein.

What I claim is:

A draining machine comprising a vat, a draining basket rotatably mounted in the vat, said basket having a vertical axis and including an upwardly directed axial projection having a recessed upper terminal surface, an elongated watertight casing, an electric motor carried inside one end of the casing, a mechanical transmission carried inside the casing, controlled by the motor and including a stub shaft projecting vertically through the portion of the casing remote from said motor, and a radially ribbed rotor carried outside the casing and fitted over said projecting stub shaft, the ribs of said rotor being nested into the recesses of said upper terminal surface of the axial basket projection and being adapted to thereby transmit the rotation of the motor to the basket.

References Cited in the file of this patent

UNITED STATES PATENTS

| | | |
|---|---|---|
| 229,413 | Howe | June 29, 1880 |
| 1,315,181 | Cavanaugh | Sept. 2, 1919 |
| 1,657,043 | Shank | Jan. 24, 1928 |
| 1,673,594 | Schmidt | June 12, 1928 |
| 1,969,179 | Kirby | Aug. 7, 1934 |
| 2,137,540 | Motycka | Nov. 22, 1938 |
| 2,700,288 | Wissing | Jan. 25, 1955 |
| 2,867,329 | Miller | Jan. 6, 1959 |

FOREIGN PATENTS

| | | |
|---|---|---|
| 480,682 | Italy | Mar. 9, 1953 |